US008509573B2

(12) United States Patent
Horiuchi

(10) Patent No.: US 8,509,573 B2
(45) Date of Patent: Aug. 13, 2013

(54) IMAGE PROCESSING APPARATUS, IMAGE PROCESSING METHOD, AND STORAGE MEDIUM

(75) Inventor: Akinori Horiuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 703 days.

(21) Appl. No.: 12/638,832

(22) Filed: Dec. 15, 2009

(65) Prior Publication Data

US 2010/0195156 A1 Aug. 5, 2010

(30) Foreign Application Priority Data

Dec. 17, 2008 (JP) ................................ 2008-321620

(51) Int. Cl.
*G06K 9/00* (2006.01)
*H04N 1/387* (2006.01)

(52) U.S. Cl.
USPC .......................................... 382/317; 358/450

(58) Field of Classification Search
USPC ................ 382/168–169, 178, 276–277, 284, 382/318; 715/764, 769; 345/629; 358/450, 358/3.21, 3.26, 519, 1.2, 498
See application file for complete search history.

(56) References Cited

U.S. PATENT DOCUMENTS

| | | | | |
|---|---|---|---|---|
| 5,732,230 | A * | 3/1998 | Cullen et al. | 715/764 |
| 6,650,791 | B1 * | 11/2003 | Cullen | 382/294 |
| 6,961,145 | B2 * | 11/2005 | Smith | 358/1.2 |
| 7,315,391 | B2 * | 1/2008 | Nakano et al. | 358/1.15 |
| 8,139,256 | B2 * | 3/2012 | Motamed | 358/1.18 |
| 2004/0022452 | A1 * | 2/2004 | McCoy | 382/284 |
| 2004/0184072 | A1 * | 9/2004 | Jacobsen et al. | 358/1.15 |
| 2005/0078871 | A1 * | 4/2005 | Pollard et al. | 382/219 |
| 2007/0124697 | A1 * | 5/2007 | Dongelmans | 715/805 |
| 2008/0231892 | A1 * | 9/2008 | Sugahara et al. | 358/1.15 |
| 2009/0091770 | A1 * | 4/2009 | Kano et al. | 358/1.1 |

* cited by examiner

*Primary Examiner* — Andrae S Allison
(74) *Attorney, Agent, or Firm* — Canon USA, Inc., I.P. Division

(57) ABSTRACT

When a plurality of images are combined together, a positioning error can occur. To correct positioning error, the images may be displayed on a display, and a user may specify a correction value using an operation device. However, in a case where the operation device does not have high performance or the display does not have a screen large enough to provide sufficiently high viewability, the correction of the positioning error is difficult. In the present invention, in view of the above, a sheet is printed and a user describes on the sheet a correction value in terms of relative position of a plurality of images stored in a memory. The sheet is read by a reading apparatus, and an image obtained is analyzed to determine the specified correction value. The relative position of the plurality of images stored in the memory is corrected based on the determined correction value.

10 Claims, 9 Drawing Sheets

FIG. 6A

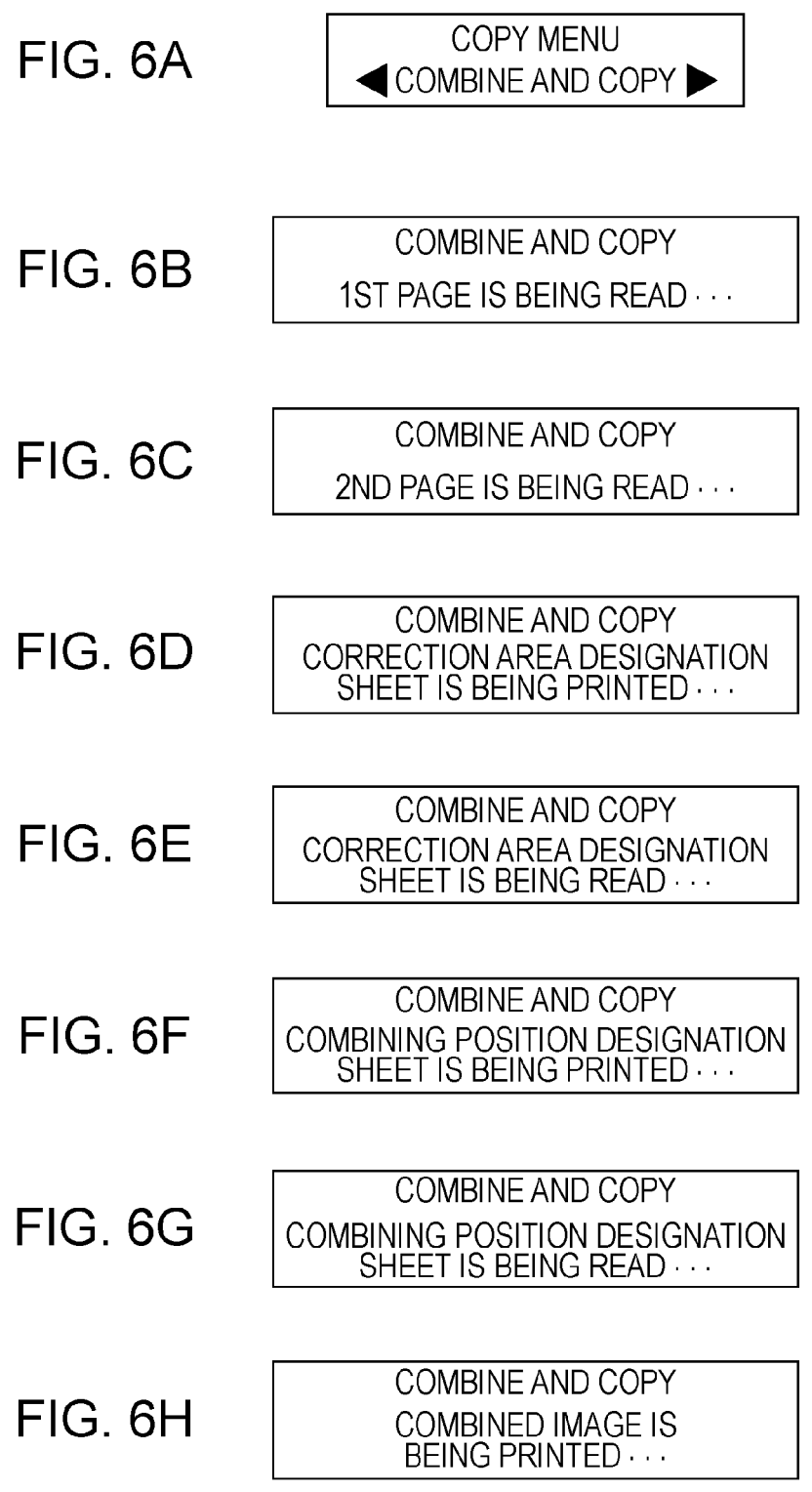

COPY MENU
◀ COMBINE AND COPY ▶

FIG. 6B

COMBINE AND COPY
1ST PAGE IS BEING READ · · ·

FIG. 6C

COMBINE AND COPY
2ND PAGE IS BEING READ · · ·

FIG. 6D

COMBINE AND COPY
CORRECTION AREA DESIGNATION
SHEET IS BEING PRINTED · · ·

FIG. 6E

COMBINE AND COPY
CORRECTION AREA DESIGNATION
SHEET IS BEING READ · · ·

FIG. 6F

COMBINE AND COPY
COMBINING POSITION DESIGNATION
SHEET IS BEING PRINTED · · ·

FIG. 6G

COMBINE AND COPY
COMBINING POSITION DESIGNATION
SHEET IS BEING READ · · ·

FIG. 6H

COMBINE AND COPY
COMBINED IMAGE IS
BEING PRINTED · · ·

CORRECTION AREA DESIGNATION SHEET

FILL MARK (WITH BLACK) CORRESPONDING TO POSITION WHERE COMBINING CORRECTION IS TO BE MADE

| A | B | C | D | E |
|---|---|---|---|---|
| 0 | 0 | 0 | 0 | 0 |

ように行われます

日時:12月24日
15:00～
場所:大会議室

CORRECTION AREA DESIGNATION SHEET

FILL MARK (WITH BLACK) CORRESPONDING TO POSITION WHERE COMBINING CORRECTION IS TO BE MADE

| A | B | C | D | E |
|---|---|---|---|---|
| 0 | 0 | ● | 0 | 0 |

ように行われます

日時:12月24日
15:00～
場所:大会議室

IMAGE PROCESSING APPARATUS, IMAGE PROCESSING METHOD, AND STORAGE MEDIUM

BACKGROUND OF THE INVENTION

1. Field of the Invention

The present invention relates to a technique to combine a plurality of images.

2. Description of the Related Art

In a scanner configured to read a document, a document size is generally equal to or smaller than can be read at a time by the scanner. For example, when a scanner is capable of reading a document of up to A4 size, the maximum document size readable by this scanner is the A4 size.

In view of the above, a technique has been proposed to read a document with a size greater than the size of a document plate by performing reading a plurality of times to obtain an image of the document part by part. A plurality of images corresponding to parts of the document are combined into a single image, and the resultant image is printed. This technique, however, has a problem that a positioning error can occur among the plurality of images read. That is, in the reading process, when a document is put by a user a plurality of times on the document plate, the position of the document on the document plate can be different each time the document is put. Therefore, if such images are combined, a misregistration among the partial images appears in the resultant combined image.

In view of the above, U.S. Pat. No. 5,732,230 discloses a technique in which a plurality of images read by a scanner are displayed on a display so that a user is allowed to correct relative positions of the respective images by operating the images on the display using a touch screen, a mouse, or the like.

However, among many apparatuses having a scanner such as copying machines, some apparatuses are low in specification, and most such apparatuses do not have a high-performance operation device and a large-size display capable of displaying an image with high viewability. In such low-specification apparatuses, it is difficult to correct relative positions of images obtained via part-by-part reading.

SUMMARY OF THE INVENTION

The present invention provides an image processing apparatus capable of easily correcting relative positions of images obtained via part-by-part reading, even if the image processing apparatus does not have a high-performance user input device or a high-resolution display. According to an aspect of the present invention, there is provided an image processing apparatus configured to combine a plurality of images, including a first print control unit configured to cause a printing apparatus to print a first sheet on which a correction value is to be described to correct a relative position of a plurality of images stored in a memory, a first determination unit configured to analyze an image obtained by reading the first sheet by a reading apparatus and determine the correction value described on the first sheet, and a correction unit configured to correct the relative position of the plurality of images stored in the memory based on the correction value determined by the first determination unit.

Further features of the present invention will become apparent from the following description of exemplary embodiments with reference to the attached drawings.

BRIEF DESCRIPTION OF THE DRAWINGS

FIGS. 6A to 6H are diagrams illustrating messages displayed on an LCD display in an operation in an image combining mode according to an embodiment of the present invention.

DESCRIPTION OF THE EMBODIMENTS

The present invention is described in further detail below, by way of example, with reference to embodiments in conjunction with the accompanying drawings. Note that relative positions of constituent elements, display screens, etc. described in the embodiments should not be construed as limiting the scope of the invention but merely as illustrating examples unless otherwise specified.

An image processing apparatus according to an embodiment of the present invention is described below. The present image processing apparatus is configured to allow one sheet of document to be read a plurality of times to obtain a plurality of images corresponding to parts of the document. The obtained plurality of images are combined together, and the resultant image is printed using a printing unit such as an ink-jet printer.

Figure 1:
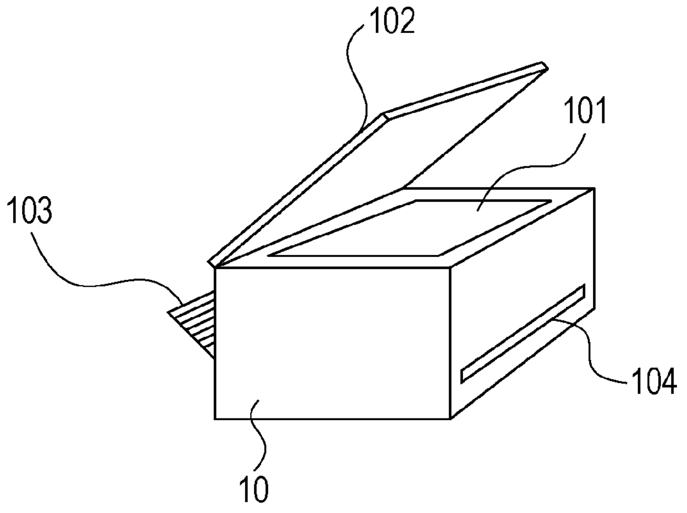
FIG. 1 is a schematic diagram of an image processing apparatus according to an embodiment of the present invention.

FIG. 1 is a schematic diagram illustrating an image processing apparatus according to the present embodiment of the invention. In FIG. 1, reference numeral 10 denotes a main body of the image processing apparatus. Reference numeral 101 denotes a document plate on which a document to be read is set. Reference numeral 102 denotes a scanner cover, which is used to block external light when a document is read. Reference numeral 103 denotes an automatic sheet feeder configured to feed inserted sheets to be printed. Reference numeral 104 denotes a sheet discharge opening through which printed sheets are discharged.

Figure 2:
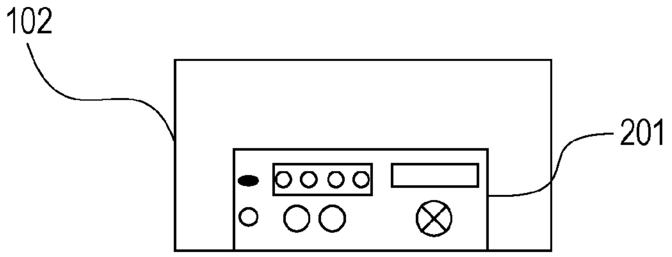
FIG. 2 is a view seen from above of an image processing apparatus according to an embodiment of the present invention.

FIG. 2 is a diagram, seen from the above, of the image processing apparatus according to the present embodiment of the invention. In FIG. 2, an operation unit 201 is located on the scanner cover 102 shown in FIG. 1.

Figure 3:
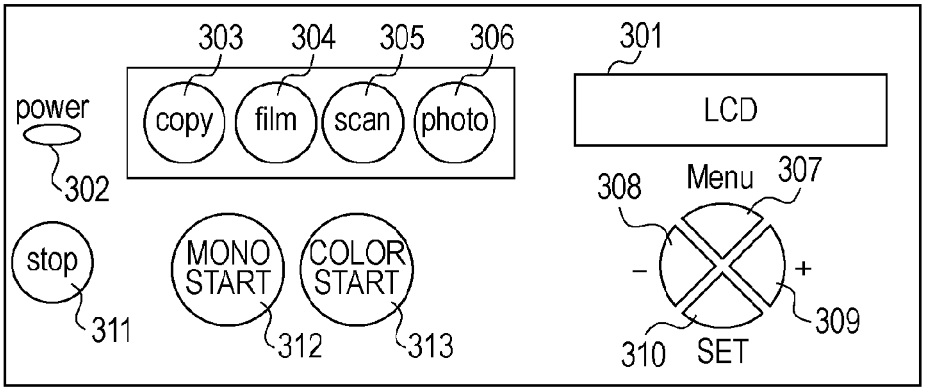
FIG. 3 is a diagram illustrating an operation unit of an image processing apparatus according to an embodiment of the present invention.

FIG. 3 is a diagram illustrating an operation unit 201 of the image processing apparatus according to the present embodiment of the invention. In FIG. 3, an LCD 301 is a display configured to display various kinds of information such as a message, an operation prompt, etc. A power key 302 is a key for turning on and off the power of the image processing apparatus 10. A copy mode key 303 is a key used to switch the image processing apparatus 10 into a state in which a copying operation is available. A film mode key 304 is a key used to switch the image processing apparatus 10 into a state in which printing from a film is possible. A scan mode key 305 is a key used to switch the image processing apparatus 10 into a state in which a scanning operation is possible. A photo mode key 306 is a key used to switch the image processing apparatus 10 into a state in which printing is allowed from a signal transmitted directly from a digital photographic card or a camera.

A menu key 307 is a key used to display a menu including items associated with setting of various operations such as copying, facsimile transmission, direct printing from a card, etc. If the menu key 307 is pressed, setting items associated with an operation to be executed are displayed on the LCD 301. After a specific item is selected using a minus key 308 or a plus key 309, if a set key 310 is pressed, the selected item is set. The minus key 308 and the plus key 309 are also used by a user to make a selection from a plurality of options in a menu in user registration or the like. The set key 310 is used to apply a selected item. A stop key 311 is used to stop an operation such as a facsimile transmitting/receiving operation, a copying operation, etc. A monochrome start key 312 is used to start monochrome facsimile transmission or monochrome copying. A color start key 313 is used to start color facsimile transmission, color copying, color photographic copying, etc.

Figure 4:
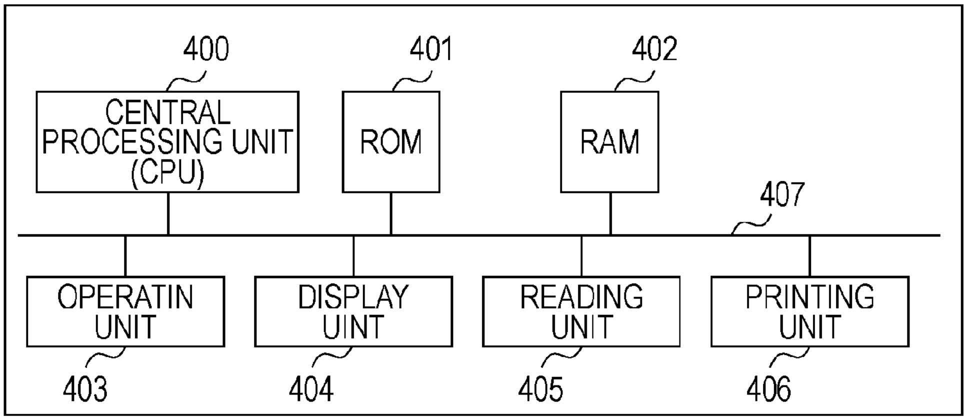
FIG. 4 is a diagram illustrating a configuration of an image processing apparatus according to an embodiment of the present invention.

FIG. 4 is a diagram illustrating a configuration of the image processing apparatus according to the present embodiment of the invention. In FIG. 4, reference numeral 400 denotes a central processing unit (CPU) that controls the whole apparatus. Reference numeral 401 denotes a read only memory (ROM) in which programs and data are stored. Reference numeral 402 denotes a volatile memory (such as DRAM) used as a storage area for temporarily storing a read image or the like. Reference numeral 403 denotes an operation unit including keys operated by a user. Reference numeral 404 denotes a display unit configured to display an operation instruction message, an error message, or the like. Reference numeral 405 denotes a reading unit configured to read a document. Reference numeral 406 denotes a printing unit configured to perform printing on a sheet using an ink-jet mechanism, a thermal jet mechanism, or the like. Reference numeral 407 denotes a system bus used in communication between various parts in the apparatus.

Figure 5:
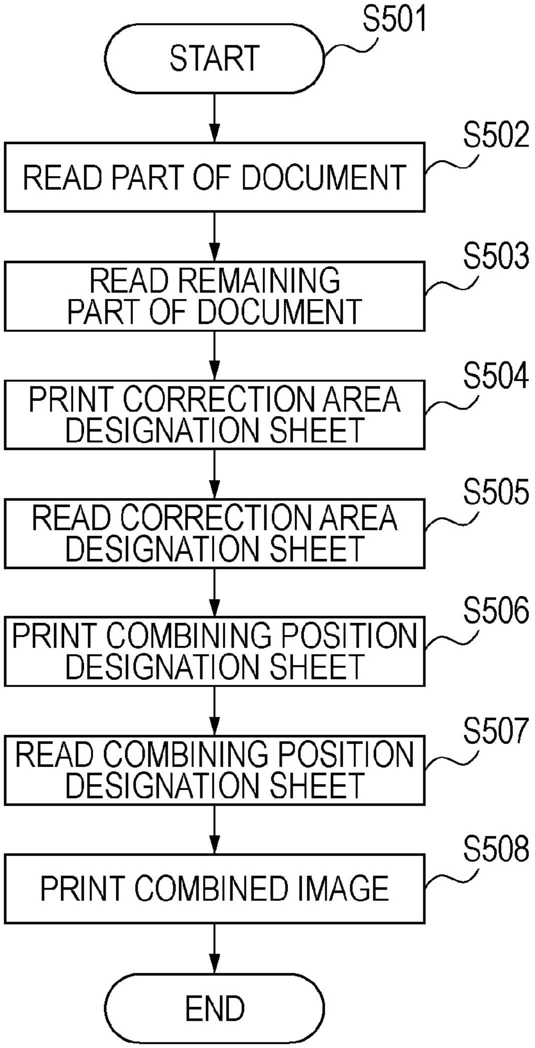
FIG. 5 is a flow chart illustrating a total flow of a process performed by an image processing apparatus according to an embodiment of the present invention.

Now, with reference to FIGS. 5 and 6, an operation of the image processing apparatus according to the present embodiment of the invention is described below. FIG. 5 is a flow chart illustrating a total flow of a process performed by the image processing apparatus according to the present embodiment of the invention. FIGS. 6A to 6H illustrate messages displayed on the LCD display in an operation in the image combining mode according to the present embodiment of the invention. In the present example, an A3-size document is read twice to obtain images of upper and lower parts of the document, and an image obtained by combining the images of the upper and lower parts is printed on an A4-size sheet. Note that the document size, the number of times the document is read, and the output size are not limited to those employed in the example. Furthermore, a method of designating sheet positions, the number of positions allowed to be designated, a method of designating a combining position, and the combining position allowed to be designated are not limited to those employed in the present example.

In step S501 in FIG. 5, an image combine-and-copy function is activated. More specifically, if the copy mode key 303 of the image processing apparatus 10 is pressed, the image processing apparatus 10 is set in the copy mode. Thereafter, the menu key 307 is pressed and then the minus key 308 and/or the plus key 309 is pressed until a menu item appears that allows a selection of the image combine-and-copy function. FIG. 6A illustrates the menu item displayed on the LCD display that allows the image combine-and-copy function to be selected. Note that other various copying modes are available in addition to the mode shown in FIG. 6A. In this state, if the set key 310 is pressed, the image combine-and-copy function is activated.

Figure 7:
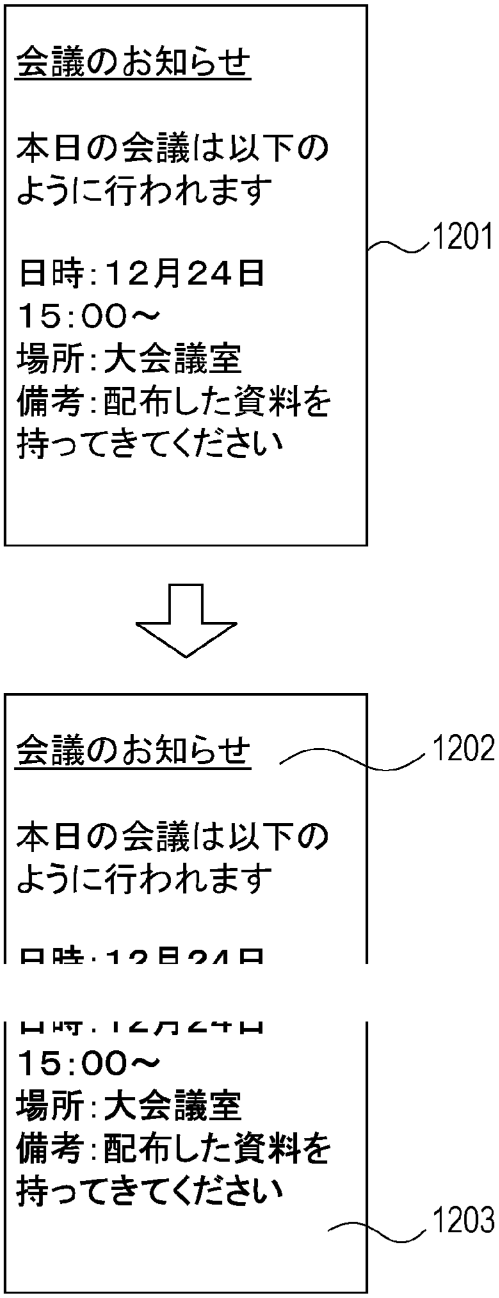
FIG. 7 is a diagram illustrating a document and an image obtained by reading the document.

In step S502, part of a document is read. If the reading of this part of the document is successfully completed, the process proceeds to step S503. FIG. 7 is a diagram illustrating a document and an image obtained by reading the document. In the example shown in FIG. 7, an upper part of an A3-size document 1201 is read and, as a result, an image 1202 is obtained. This image is stored in the DRAM 402 under the control of the CPU 400. In step S503, the remaining part of the document is read. In the present example, a lower part of the A3-size document 1201 shown in FIG. 7 is read, and, as a result, an image 1203 is obtained. During the process in step S502 and the process in step S503, messages are displayed on the LCD 301 as shown in FIGS. 6B and 6C, respectively. The obtained image is stored in the DRAM 402 under the control of the CPU 400. If the reading of the remaining part of the document is successfully completed, the process proceeds to step S504.

Figure 8:
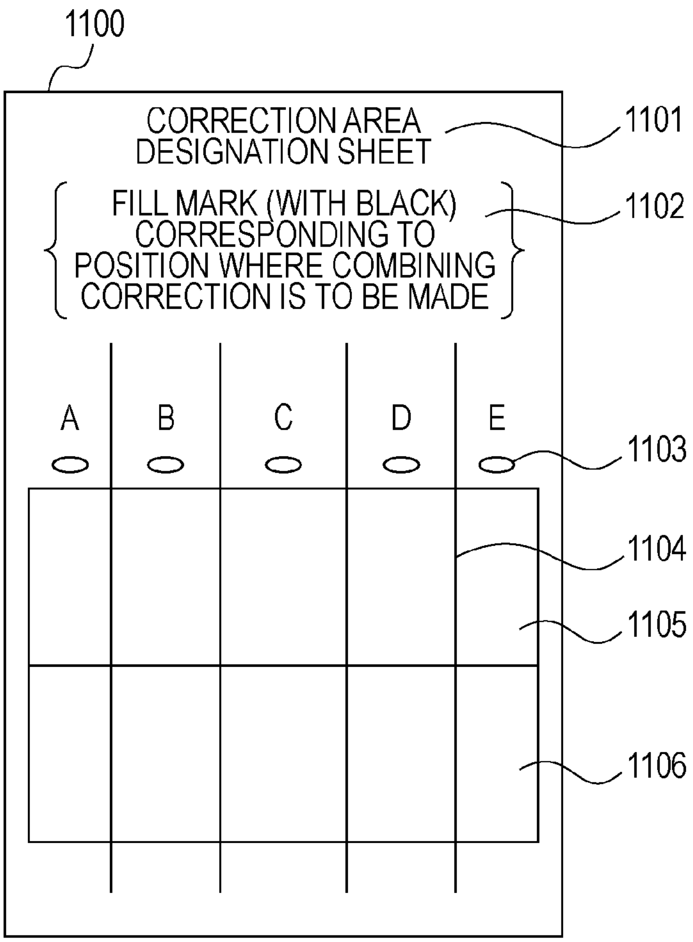
FIG. 8 is a diagram illustrating a correction area designation sheet printed in step S504 in FIG. 5.
Figure 9A:
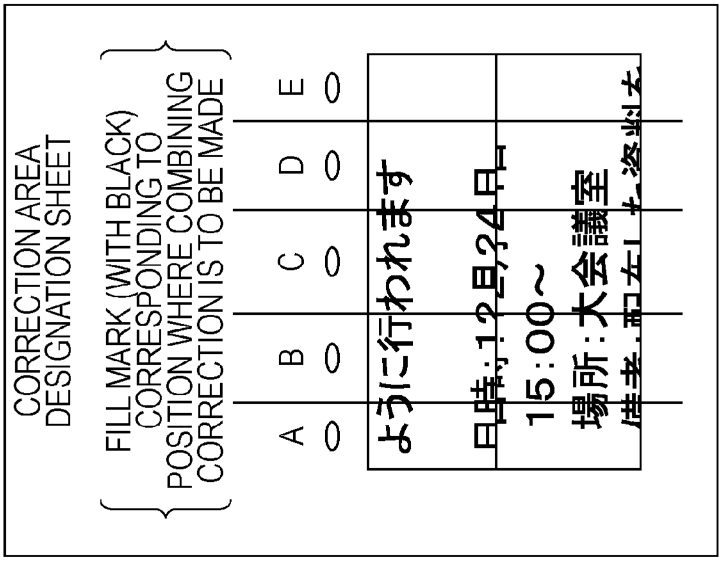
FIGS. 9A and 9B are diagrams illustrating an example of a correction area designation sheet.
Figure 9B:
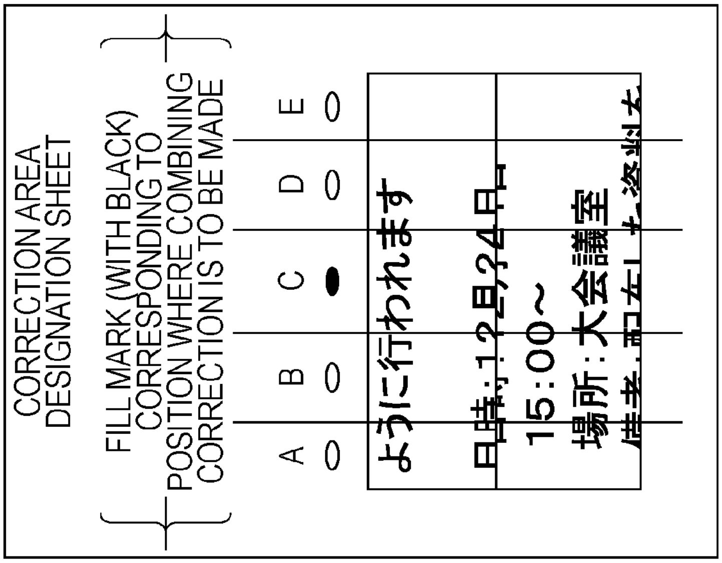

In step S504, using the image read in steps S502 and S503, a correction area designation sheet is printed. A user is allowed to designate an area of the combined image that is to be used in the correction, by completing the correction area designation sheet. In the printing process in step S504, a message is displayed on the LCD 301 as shown in FIG. 6D. FIG. 8 is a diagram illustrating a form of the correction area designation sheet printed in step S504 in FIG. 5. In the correction area designation sheet 1100 of the present example, reference numeral 1101 denotes a title part of the correction area designation sheet. Reference numeral 1102 denotes a description part of the correction area designation sheet, in which a description is given as to how to designate the correction area. Reference numeral 1103 denotes one of marks used to designate a correction area. Each mark corresponds to a particular area of the image. In the example shown in FIG. 8, the respective marks correspond to areas A to E. The user selects an area to be used in the correction of the relative position of the images and fills the selected mark. Reference numeral 1104 denotes separator lines indicating selectable candidates for the relative position. Reference numeral 1105 denotes a region in which the image read in step S502 is printed in such a manner as to indicate in an enlarged fashion a part of the image in an area in contact with or close to where images are to be combined. Reference numeral 1106 denotes a region in which the image read in step S503 is printed in such a manner as to indicate in an enlarged fashion a part of the image in an area in contact with or close to where images are to be combined. Although in the present example, vertically extending separator lines are used to define a correction area, the correction area may be defined in other ways. FIGS. 9A and 9B illustrate an example of a correction area designation sheet. In FIG. 9A, a part of the image 1202 in an area close to the combining position and a part of the image 1203 in an area close to the combining position are printed as combining-part images in the respective regions 1105 and 1106 on the correction area designation sheet shown in FIG. 8.

As described above, if the correction area designation sheet is printed in step S504, the user fills in the sheet. More specifically, the user selects an area that allows the combining correction to be most easily performed, and the user completes the correction area designation sheet printed in step S504 by filling in a mark with black corresponding to the selected area. In the present example, it is assumed that the user determines that an area C is the best area for the combining correction and fills in a mark corresponding to the area C as shown in FIG. 9B.

Next, in step S505, if the user puts the completed correction area designation sheet on the document plate and presses the set key 310 shown in FIG. 3, the sheet is read. During this reading process, the status of the process is displayed on the LCD 301 as shown in FIG. 6E. The image obtained as a result of the reading is analyzed to detect the filled-in mark on the sheet. More specifically, each mark on the sheet is checked whether it is filled in or not, and an area corresponding to the detected filled-in mark is determined to be specified. In the present example, in the correction area designation sheet, as shown in FIG. 9B, the mark corresponding to the area C is filled in with black, and thus it is determined that the area C is specified. If the reading of the correction area designation sheet is successfully completed, and the specified position is successfully detected, the process proceeds to step S506.

In step S506, according to correction area information detected in step S505, a combining position designation sheet is printed. During this process, the status of the process is displayed on the LCD 301 as shown in FIG. 6F.

Figure 10:
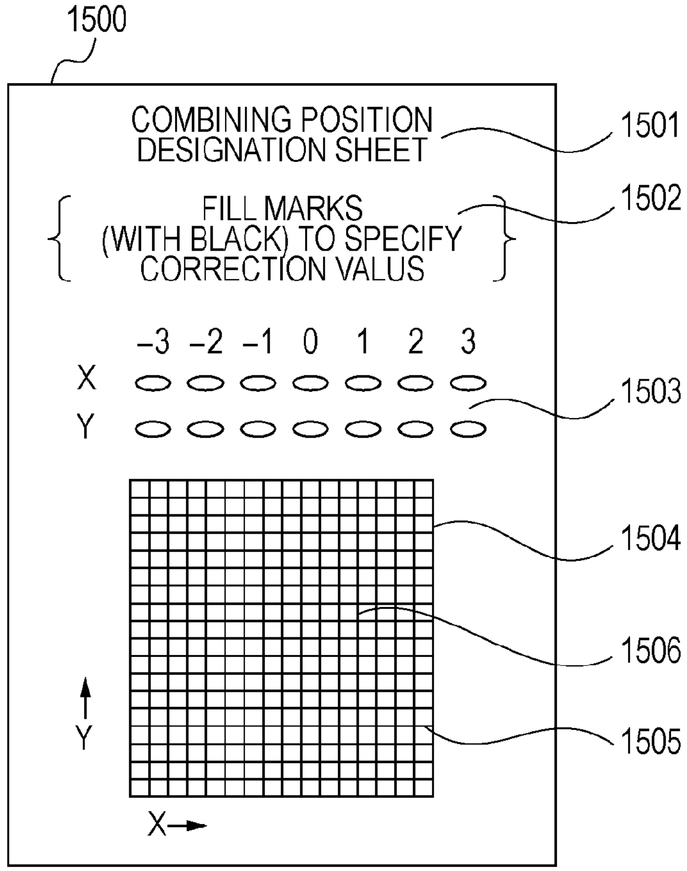
FIG. 10 is a diagram illustrating a form of a combining position designation sheet printed in step S506.

FIG. 10 is a diagram illustrating a form of the combining position designation sheet printed in step S506. In FIG. 10, reference numeral 1500 denotes a whole combining position designation sheet according to the present embodiment. Reference numeral 1501 denotes a title part of the combining position designation sheet. Reference numeral 1502 denotes a description part of the combining position designation sheet, in which a description is given as to how to designate the combining position. Reference numeral 1503 denotes marks used to designate the combining position. Of the combining-part images in the areas in contact with or close to where the images read in steps S502 and S503 are combined, the parts of the images in the area determined in step S505 are printed in an enlarged manner in regions 1504 and 1505. Reference numeral 1506 denotes separator lines defining units in which the combining position is designated.

In the present embodiment, the combining position is designated by numerical values, and the separator lines are provided in the form of a lattice such that the numerical values can be easily determined by the lattice. However, the method of defining the combining position is not limited to that using the separators employed in the present example, but the combining position may be defined in other ways.

Figure 11A:
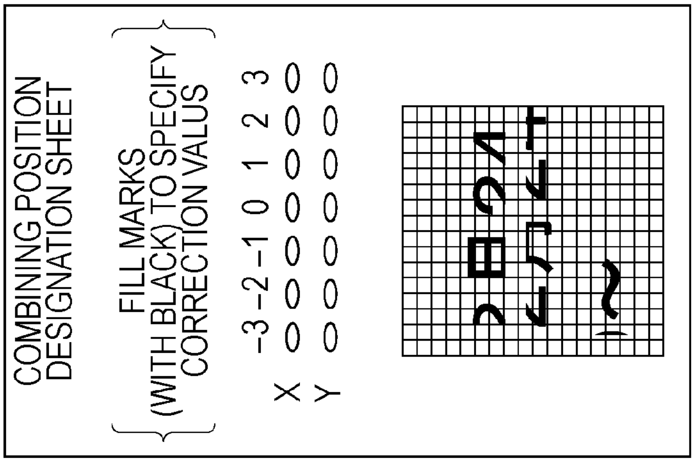
FIGS. 11A and 11B are diagrams illustrating an example of a combining position designation sheet.
Figure 11B:
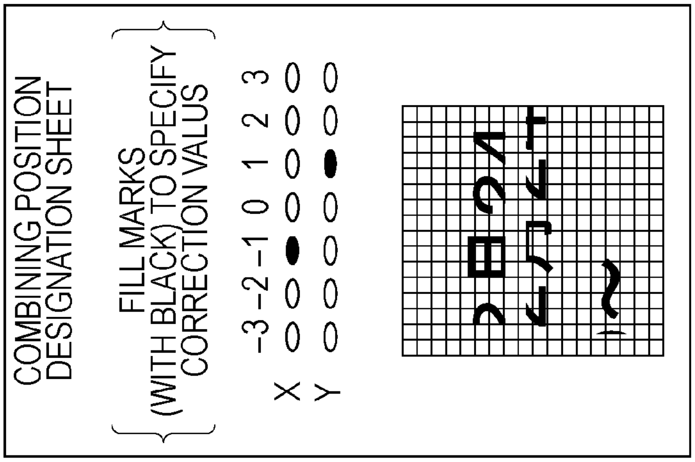

A user is allowed to specify correction values in terms of the relative position of the images by completing the combining position designation sheet. FIGS. 11A and 11B are diagrams illustrating an example of a combining position designation sheet. In the example shown in FIG. 11A, the parts of the images 1202 and 1203 in the area C determined in step S505 are printed in an enlarged manner in areas 1504 and 1505, respectively.

As described above, if the combining position designation sheet is printed in step S506, the user completes the sheet. More specifically, on the combining position designation sheet printed in step S506, the user selects values that are closest to a shift between the two images, and fills corresponding marks with black. In the present embodiment, the combining position of the lower image is specified with respect to the upper image. In the present example, the user determines that the positioning error can be best corrected by shifting the lower image by −1 in an X direction and +1 in a Y direction. Thus, as shown in FIG. 11B, a mark corresponding to −1 in the X direction and a mark corresponding to +1 in the Y direction are filled with black.

Next, in step S507, if the user puts the filled-in combining position designation sheet on the document plate and presses the set key 310 shown in FIG. 3, the sheet is read. During this process, the status of the process is displayed on the LCD 301 as shown in FIG. 6G. An image obtained by reading the sheet is analyzed to detect the marks filled with black. If marks filled with black are detected, it is determined that a relative position corresponding to the detected marks filled with black is specified. In the present example, as shown in FIG. 11B, by reading the combining position designation sheet, it is detected that the mark corresponding to −1 in the X direction and the mark corresponding to +1 in the Y direction are filled, and thus it is determined that the position obtained by shifting by −1 in the X direction and +1 in the Y direction is specified by the user as the relative position at which the images are to be combined. If the reading of the combining position designation sheet is successfully completed, and if the designated combining position is successfully detected, the process proceeds to step S508.

In step S508, the images are combined at the relative position determined based on the filled marks on the sheet detected in step S507, and a resultant combined image is printed. During this process, the status of the process is displayed on the LCD 301 as shown in FIG. 6H. In this specific case, as described above, after the lower image is shifted by −1 in the X direction and +1 in the Y direction with respect to the upper image, the upper and lower images are combined. In the present embodiment, as described above with reference to FIG. 7, an A3-size document is read twice part by part, and a combined image is printed on an A4-size sheet. Therefore, the original partial images 1202 and 1203 are reduced by about 70% in the combined image. If the printing of the combined image is successfully completed, then in step S509, the operation in the image combining mode is ended.

Note that in the process of printing the combined image with the corrected positioning error, the partial images may be first combined on a memory and then the printing may be performed, or the partial images may be directly printed while shifting the print start positions of the respective partial images.

When the images read in steps S502 and S503 are stored in the DRAM 402, the images are generally compressed into a JPEG form or the like. In this case, when the combining-part images are printed on the correction area designation sheet or the combining position designation sheet, decompression is performed for the whole image to obtain decompressed combining-part images. In view of the above, when the read images are stored in the DRAM 402, the combining-part images may be stored separately from the whole image.

In the embodiment described above, after the correction area designation sheet is printed and read, the combining position designation sheet is printed. However, the printing of the correction area designation sheet may be omitted. In this case, the whole combining area where the read images are to be combined may be printed on the combining position designation sheet, or a part of the combining area may be printed on the combining position designation sheet. Alternatively, the whole images to be combined may be printed on the combining position designation sheet.

In the embodiment described above, particular marks on the sheets are filled with black by a user. Alternatively, particular marks may be checked. Instead of determining the correction values based on marks filled or checked, the correction values may be determined directly based on numerals written by a user.

In the embodiment described above, the image processing apparatus includes the reading unit configured to perform reading and the printing unit configured to perform printing. The present invention is not limited to such a configuration, but an external reading apparatus and an external printing apparatus may be connected to the image processing apparatus, and the image processing apparatus may control the reading apparatus and the external printing apparatus. In this case, image data obtained by reading a document on the reading apparatus may be input to the image processing apparatus, and the image processing apparatus may control the printing apparatus to print a sheet according to the input image data. A combined image may be printed by the printing apparatus under the control of the image processing apparatus according to correction values specified by the sheet read by the reading apparatus.

In addition to or instead of printing the combined image, the combined image may be output in other ways. For example, the combined image may be displayed on a display apparatus or stored in a memory.

In the present embodiment, as described above with reference to the embodiments, a user is allowed to fill in or check particular marks on a sheet to specify the relative position at which images are to be combined thereby making it possible to easily perform accurate positioning between the images even when the image processing apparatus does not have a large-size display unit with a high resolution or an operation unit capable of precisely moving an image on the display unit.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-321620, filed Dec. 17, 2008, which is hereby incorporated by reference herein in its entirety.

What is claimed is:

1. An image processing apparatus configured to combine a plurality of images, comprising:

a first print control unit configured to cause a printing apparatus to print a first sheet for adding first information, by a user, for specifying a part of each of the plurality of images to be used for determining a relative position of the plurality of images;

a first determination unit configured to input a first read image obtained by reading the first sheet, including the first information, printed by the first print control unit by a reading apparatus and determine the part of each of the plurality of images specified by the information included in the inputted first read image;

a second print control unit configured to cause a printing apparatus to print a second sheet on which the part of each of the plurality of images determined by the first determination unit is included and second information for determining the relative position of the plurality of images is to be added by the user based on the part;

a second determination unit configured to input a second read image obtained by reading the second sheet including the second information, printed by the second print control unit by the reading apparatus and determine the relative position of the plurality of images based on the second information included in the inputted second read image; and a combining unit configured to combine the plurality of images based on the relative position determined by the first determination unit.

2. The image processing apparatus according to claim 1, wherein the first determination unit determines the part of each of the plurality of images where the plurality of images are to be combined.

3. The image processing apparatus according to claim 1, wherein the first print control unit causes the printing apparatus to print the first sheet such that fill-in fields corresponding to parts of the images are printed on the first sheet, and wherein the first determination unit determines the specified area based on whether the fill-in fields are filled in.

4. The image processing apparatus according to claim 1, further comprising a third printing control unit configured to cause the printing apparatus to print a combined image of the plurality of images obtained by combining the plurality of images by the combining unit.

5. The image processing apparatus according to claim 1, further comprising a printing unit configured to print an image, wherein the first print control unit causes the printing unit to perform the printing and the second print control unit causes the printing unit to perform the printing.

6. The image processing apparatus according to claim 1, further comprising a reading apparatus configured to read a document, wherein the first determination unit inputs the first read image obtained by reading the first sheet by the reading apparatus, and the second determination unit inputs the second read image obtained by reading the second sheet by the reading apparatus.

7. The image processing apparatus according to claim 1, wherein the second print control unit causes a printing apparatus to print fill-in fields corresponding to values corresponding to candidates of the relative position of the plurality of images on the second sheet, and wherein the second determination unit determines the relative position of the plurality of images based on whether the fill-in fields are filled in.

8. The image processing apparatus according to claim 1, further comprising:

a storage control unit configured to store images read by the reading apparatus in the memory, wherein the combining unit combines the plurality of images stored by the storage control unit in the memory.

9. An image processing method for combining a plurality of images, comprising:

causing a printing apparatus to print a first sheet for adding first information, by a user, for specifying a part of each of the plurality of images to be used for determining a relative position of the plurality of images;

inputting a first read image obtained by reading the first sheet, including the first information printed by the printing step, by a reading apparatus and determining the part of each of the plurality of images specified by the information included in the inputted first read image;

causing the printing apparatus to print a second sheet on which the part of each of the plurality of images determined in the inputting step is included and second information for determining the relative position of the plurality of images is to be added by the user based on the part;

inputting a second read image obtained by reading the second sheet, including the second information, printed by the seconded printing step, by the reading apparatus and determining the relative position of the plurality of images based on the second information included in the inputted second read image; and combining the plurality of images based on the determined relative position.

10. A non-transitory computer-readable storage medium in which a program is stored, the program being executable by a computer to perform the image processing method according to claim 9.

* * * * *